(12) United States Patent
Allan et al.

(10) Patent No.: US 7,688,756 B2
(45) Date of Patent: Mar. 30, 2010

(54) PROVIDER LINK STATE BRIDGING

(75) Inventors: David Allan, Ottawa (CA); Nigel Bragg, Weston Colville (GB)

(73) Assignee: Nortel Networks Limited, Quebec (CA)

( * ) Notice: Subject to any disclaimer, the term of this patent is extended or adjusted under 35 U.S.C. 154(b) by 673 days.

(21) Appl. No.: 11/537,775

(22) Filed: Oct. 2, 2006

(65) Prior Publication Data
US 2007/0086361 A1 Apr. 19, 2007

Related U.S. Application Data

(60) Provisional application No. 60/723,479, filed on Oct. 5, 2005, provisional application No. 60/735,884, filed on Nov. 14, 2005, provisional application No. 60/745,330, filed on Apr. 21, 2006.

(51) Int. Cl.
*H04L 12/28* (2006.01)
(52) U.S. Cl. ........................................ 370/254; 370/401
(58) Field of Classification Search ................. 370/238, 370/254, 389, 398, 401
See application file for complete search history.

(56) References Cited

U.S. PATENT DOCUMENTS 7,411,963 B2 * 8/2008 Ward et al. ................. 370/398
2005/0265328 A1 * 12/2005 Bettink ....................... 370/389

FOREIGN PATENT DOCUMENTS

WO WO 02/078250 10/2002

OTHER PUBLICATIONS

Christie Bolton, Gavin Lowe, "Analyses of the Reverse Path Forwarding Routing Algorithm", IEEE Computer Society, Proceedings of the 2004 International Conference on Dependable Systems and Networks (DSN'04) 0-7695-2052-9/04, (DSN 2004), Jun. 28-Jul. 1, 2004, pp. 485-494.
R. Garcia, J. Duato, F. Silla, "LSOM: A Link State Protocol Over Mac Addresses for Metropolitan Backbones Using Optical Ethernet Switches", IEEE Computer Society, Proceedings of the Second IEEE International Symposium on Network Computing and Applications (NCA'03) 0-7695-1938-5/03 (NCA 2003) Apr. 16-18, 2003, pp. 315-321.

(Continued)

*Primary Examiner*—Jayanti K Patel
*Assistant Examiner*—Matthew Campbell
(74) *Attorney, Agent, or Firm*—Garvey, Smith, Nehrbass & North, L.L.C.; Brett A. North

(57) ABSTRACT

Provider Link State Bridging (PLSB) expands static configuration of Ethernet MAC forwarding tables by the control plane and utilizes direct manipulation of Ethernet forwarding by a link state routing system. At least one media-access-control (MAC) address for unicast forwarding to the bridge and at least one MAC address for multicast forwarding from the bridge are assigned. Bridges exchange state information by a link state bridging protocol so that a synchronized configured view of the network is shared between nodes. Each node can calculate shortest path connective between peer bridging nodes and populated the appropriate forwarding tables. A reverse path forwarding check is performed on incoming packets to provide loop suppression. During times of network instability the loop suppression can be disabled for unicast packets as identified by the destination MAC address to buffer packets and minimize the impact on traffic flow.

32 Claims, 10 Drawing Sheets

OTHER PUBLICATIONS

Guillermo Ibanez, Alberto Garcia, Arturo Azcorra, "Alternative Multiple Spanning Tree Protocol (AMSTP) for Optical Ethernet Backbones", IEE Computer Society, Proceedings on the 29th Annual IEEE International Conference on Local Computer Networks (LCN'04) 0742-1303/04 (LCN 2004), Nov. 16-18, 2004, pp. 744-751.

Frank Brockners, Norman Finn, Steve Phillips, "Metro Ethernet—Deploying the extended Campus using Ethernet Technology", IEEE Computer Society, Proceedings of the 28th Annual IEEE International Conference on Local Computer Networks (LCN'03) 0742-1303/03 (LCN 2003), Oct. 20-24, 2003, pp. 594-604.

Finn, Norman, "Shortest Path Bridging", Sep. 22, 2005, Slides 1-95, Presented to IEEE 802.1, Garden Green, California.

Finn, Norman, "Shortest Path Bridging", Additional Information, pp. 1-23, Presented to IEEE 802.1, Sacramento, CA, Jan. 13, 2006.

Bryant, S., Shand, M., Cisco Systems, Network Working Group Internet Draft, A Framework for Loop-free Convergence, pp. 1-21, Mar. 2006.

* cited by examiner

301)

302)

303)

304)

PROVIDER LINK STATE BRIDGING

CROSS-REFERENCE TO RELATED APPLICATIONS

This application claims priority of U.S. Provisional Patent Application Ser. No. 60/723,479 filed Oct. 5, 2005, U.S. Provisional Patent Application Ser. No. 60/735,884 filed Nov. 14, 2005 and U.S. Provisional Patent Application Ser. No. 60/745,330 filed Apr. 21, 2006. Each of the above applications is incorporated herein by reference.

TECHNICAL FIELD

The present invention relates to Ethernet traffic routing protocols, and in particular to configuring connectivity in a meshed Ethernet network.

BACKGROUND

In Ethernet network architectures devices connected to the network compete for the ability to use the shared telecommunications path at any given time. Where multiple bridges or nodes are used to interconnect network segments, multiple potential paths to the same destination will exist in a meshed network architecture. The benefit of this architecture is that it provides path redundancy between bridges and permits capacity to be added to the network in the form of additional links. However the Ethernet paradigm of flooding and learning means that typically the breadth of connectivity that exists in a mesh network cannot be exploited at any given instant in time due to the requirement to ensure that no replicating path can loop. It should be noted that bridges can be interconnected by simple links or by shared LAN segments or by shared Virtual LAN segments. From the point of view of this document, segment, virtual segment and link are effectively interchangeable.

Each bridge node in an Ethernet network learns which devices or station can be reached via which local Ethernet segment by observing which segment packets from a given device arrive upon. When sending to an unknown device (one for which no forwarding information exists in the forwarding information base (FIB)), a bridge will replicate the message on all attached segments (this is known as flooding). This has two effects, bridges observing the flooded packet learn reachability information to the originating device, and there is an expectation that at some point in the future a reply solicited by the message or a subsequent unsolicited message from the intended destination device will be observed from which it can be noted via which segment the device replied to the message. Gradually, the bridge builds a picture for itself of what next segment is appropriate to reach specific devices in the network. When subsequent messages are sent, the bridge can use its FIB to determine which locally attached segment to forward it to. The approach of allowing the bridges to learn the network through experience is known as transparent bridging. One key benefit of the technique is that bridging does not require setup by an administrator.

In a mesh, when a packet is forwarded between peer devices it may be possible for the packet to traverse through multiple bridges via a plurality of paths. However, if the packet were to be sent on multiple routes simultaneously, network congestion would increase and possible looping conditions may result. This scenario arises in a mesh for multicast and/or flooded traffic as the number of copies of a given packet would grow exponentially if unchecked. A Spanning Tree Protocol (STP) algorithm is utilized to eliminate packet duplication by iteratively electing a spanning tree logically connecting the set of participating nodes. The algorithm is specifically constructed to avoid bridge loops (multiple paths linking one segment to another, resulting in an infinite loop situation) The algorithm typically computes the shortest path from all segments to an elected root bridge. If the best path fails, the algorithm recalculates the network and finds the next best route. If the root fails, a new root is elected and the algorithm re-runs. At the same time, all learned MAC information with respect to device reachability is discarded, and the FIBs are gradually repopulated via flooding and learning once the new spanning tree is established.

STP provides connectivity while preventing undesirable loops in a network that would exist if there were multiple active paths between nodes or devices. If loops were permitted to form, packets entering the loop circulate until a node takes action to remove the packet or the loop is broken. If the bridges in the loop flood, or the packet is a multicast packet, additional copies of the packet will be generated in each traversal of the loop, a highly undesirable outcome. To establish loop free connectivity, STP creates a tree that spans all of the bridges in an extended network, forcing redundant paths into a standby, or blocked, state. STP allows only one active path at a time between any two points in the network, this prevents loops but the additional capacity associated with physical mesh connectivity is not utilized. STP was designed for nodes without state memory for bridge simplicity. However the simplistic approach to loop-free connectivity can result in an excess of un-used network capacity due to the requirement to prune the physical topology to a single loop-free spanning tree.

Root election during STP convergence is determined by the set of bridges determining which bridge has lowest ID and then each bridge determining the next hop on the path of lowest cost to the bridge with the lowest ID, or "root". The bridges initially advertise their own ID and null cost in spanning tree protocol exchanges. When they receive an advertisement with a lower ID, they stop advertising their own ID and advertise the lower ID and cost. Similarly when they see a segment with a lower cost to the current lowest ID, they modify both their re-radiated advertisements and internal state accordingly. Eventually the network will converge on a common view of the lowest ID, and each bridge knowing the next segment on the lowest cost path to the root. If costs change, or if one network segment in the spanning tree becomes unreachable, the STP algorithm iteratively computes a new spanning tree topology to offer connectivity utilizing the revised set of segments. While the bridges of the network are not converged, ports are blocked stopping network traffic in order to prevent looping and replication.

FIG. 1 shows an example of how a spanning tree protocol algorithm in a mesh network affects the forwarding of a packet through the network. From a source device A, the STP algorithm has mapped out a path from through the network by determining links between each node that achieve the lowest cost (shown as multicast route). This route determines the paths available for all the traffic traversing the network. Device A, attached to bridge 110 sends a packet to device B which is new on the network. The bridges of the network do not have forwarding tables populated for this device. The packet is flooded into the network to each bridge node by the path defined by the spanning tree. Following the spanning tree packets are forwarded from bridge 110 through bridge 112. The links from bridge 110 to the neighboring bridges 116 and 120 are not utilized as they have been disabled or blocked and are not part of the spanning tree. From bridge 112 the packet is forwarded to the other nodes of the network, bridges 120, 122, 124, and 114. Bridge 114 in turn forwards the packet to bridges 116 and 118. Device B receives a flooded copy of the packet via bridge 122. All intermediate bridges will note the segment of arrival for source "A" and update their FIBs accordingly. A response sent by device B will then traverse the network directly to device A without being flooded as the return route is known to the intermediate bridges in the network. Essentially a flood of packets enters the network with one response back from device B to device A, and similar to how intermediate bridges learned optimal forwarding to "A" observing the initial message, they learn optimal forwarding to "B" observing the response.

Using STP in an Ethernet network limits the utilization efficiency of thee links or LAN segments in the network. Segments and links not selected by the STP algorithm are disabled and essentially not part of the active network topology until some change in the physical topology of the network occurs such that the link is part of the resultant spanning tree. This strands the capacity of these links. In a small LAN environment this may not be an issue, however in a WAN or provider network unused capacity both impacts scaling and represents under utilized investment. In addition when a failure does occur, the performance of the whole network is impacted during the time required to re-converge STP and stabilize all the bridges in the network. The path taken by a given packet utilizing spanning tree is typically not the shortest path between the source and destination as the root of the current spanning tree is not necessarily on the physical shortest path. For example, if device C were connected to neighboring bridge 116, packets from device A would still have to traverse bridges 112 and 114 based upon the current spanning tree which does not necessarily provide the shortest path to bridge 116. Finally in a provider network there may be many small communities of interest in the form of virtual private networks, and to constrain flooding of information within those communities of interest requires typically a distinct spanning tree per community.

Various methods have been proposed to improve STP performance and mitigate loop formation in meshed Ethernet network. Some current proposals require an MPLS-like label or the additional of time-to-live (TTL) field to Ethernet packet to limit the impact of looping. However fundamental data plane modifications are required to implement these solutions which limits their utility. In addition, only limiting the number of times a packet may replicate is a demonstrably incomplete solution to the looping problem.

In order to scale Ethernet from the LAN space to the WAN or provider network space an improved mechanism for creating efficient loop-free Ethernets is required. This is one which makes superior utilization of mesh connectivity, constrains the impact of failures or topology changes (e.g. does not interrupt or minimizes interruptions of connectivity), and suppresses loops or mitigates the effect of looping. Therefore, there is a need for an Ethernet network with improved network utilization while avoiding the pitfalls of transient or persistent Loops.

SUMMARY OF THE INVENTION

The present invention is to provides a system and method for creating loop free Ethernet networks by utilizing Provider Link State Bridging (PLSB). PLSB expands static configuration of Ethernet MAC forwarding tables by a control plane, and utilizes direct manipulation of Ethernet forwarding by a link state routing system. At least two MAC addresses are associated with each bridge, one for unicast forwarding to the bridge and one for multicast forwarding from the bridge. The unicast MAC is used by peer bridges when sending packets to the bridge as the destination address for a packet, and identifies the bridge as the source for unicast or multicast traffic from the bridge to its' peers. The multicast address is used by the bridge when sending traffic to multiple peer bridges simultaneously to identify the specific multicast tree configured by the routing system.

Bridges exchange state information by a link state protocol and maintain a state database utilized to determine shortest paths between peer bridges by a shortest path algorithm. Under conditions of Equal Cost Multiple Paths between any two bridges, a consistent choice of path is made by all bridges, such that "go" and "return" unicast paths and the relevant segments of the two multicast trees are co-routed. The forwarding tables or forwarding information base (FIB) is them populated with appropriate unicast and multicast addresses. Unique unicast and multicast distribution trees are then created at each bridge providing more efficient link utilization.

Loop suppression is provided by a reverse path forwarding check performed on received packets at each bridge. The RPFC determines if the packet has arrived on the correct port or interface as identified in the FIB, packets that do not arrive on the correct port are discarded. This is possible because of the co-routed property of all paths between any two points (as above). During time of network instability, such as during a bridge or link failure where looping may potentially occur and the network topology is not converged, RPFC may be disabled for unicast packets to minimize the impact on traffic. When the topology re-converges at each bridge RPFC can be re-enabled. For multicast traffic the RPFC is never disabled to reduce the possibility of unbounded replication.

Virtual private networks (VPNs) can be mapped on top of the PLSB network allowing for a unique multicast tree to be mapped per VPN per edge bridge so that traffic is only directed to the specific unique community of interest. Multicast VPN traffic is only delivered to bridges participating in the VPN by the VPN group multicast addresses being installed for the paths that are common.

Networks can be scaled by utilizing other technologies such as Provider Backbone Transport (as described in commonly assigned application US20050220096) and 802.1ah Provider Backbone Bridges in combination with PLSB. PBB can be used to tie PLSB areas together such as PLSB WAN domains and PLSB metro domains or extend connectivity using PBT.

Thus, an aspect of the present invention provides a provider link state bridging Ethernet node, the node comprising at least one associated unicast media-access-control (MAC) address; at least one associated multi-cast MAC address; a routing module for exchanging link state routing information between nodes based upon the respective unicast MAC address and a plurality of multicast MAC addresses of peer nodes and for determining shortest path connectivity between peer nodes and wherein when multiple equal cost paths are available, the selected shortest path is arranged to be consistent for all bridges participating in the routing information exchange; a forwarding information base (FIB) populated with forwarding information received from the routing module for identifying connectivity from the node to peer bridge nodes, wherein the unicast MAC addresses point to peer nodes and the multicast address point from peer nodes; a reverse path forwarding check (RPFC) module for inspecting incoming packets and determining whether the packets arrived on the same ingress port as would be used as an egress port, as determined by the FIB, to forward a packet with a destination MAC address equal to the ingress source MAC address; and a forwarding module for determining, from the FIB, if an egress port of the node is associated with the destination MAC address of a deer bridge and forwarding the packet.

A further aspect of the present invention provides a method of configuring and operating a provider link state bridging Ethernet node in a mesh network, the method comprising exchanging link state information with peer nodes wherein each node has at least one associated unicast media-access-control (MAC) address and at least one multicast MAC address; determining shortest paths to peer nodes by a shortest path algorithm based upon the exchanged link state information and wherein when multiple equal cost paths are available, the selected shortest path is arranged to be consistent for all bridges participating in the routing information exchange; populating a forwarding information base (FIB) with the determined shortest paths utilizing associated unicast MAC addresses pointing to peer nodes and multicast MAC addresses pointing from peer nodes; performing a reverse path forwarding check (RPFC), by determining by inspecting the source MAC address of an incoming packet whether the packet arrived on the same ingress port of the node as would be used as an egress port of the node to forward a packet with a destination MAC address equal to the ingress source MAC address, wherein the packet is discarded if the RPFC fails; and forwarding the packet to a peer bridge, if the RPFC is successful, via an egress port of the node associated with the destination MAC of the packet as identified in the FIB.

Yet a further aspect of the present invention is provides An Ethernet bridging network comprising a plurality of bridges each having a forwarding information base (FIB) containing forwarding information for peer bridges in the network, each bridge capable of performing a reverse path forwarding check (RPFC) to determine if an incoming packet arrived on the same ingress port of the bridge as would be used as an egress port of the bridge to forward a packet with a destination MAC address equal to the incoming packet's source MAC address, a plurality of paths interconnecting the bridges and forming the mesh network; and wherein the FIB is populated based upon link state information exchanged between the plurality of bridges and is used to determine the shortest path between peer bridges, wherein the determination of the chosen paths when multiple equal cost paths are available is arranged to be consistent for peer bridges.

Other aspects and features of the present invention will become apparent to those ordinarily skilled in the art upon review of the following description of specific embodiment of the invention in conjunction with the accompanying figures.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
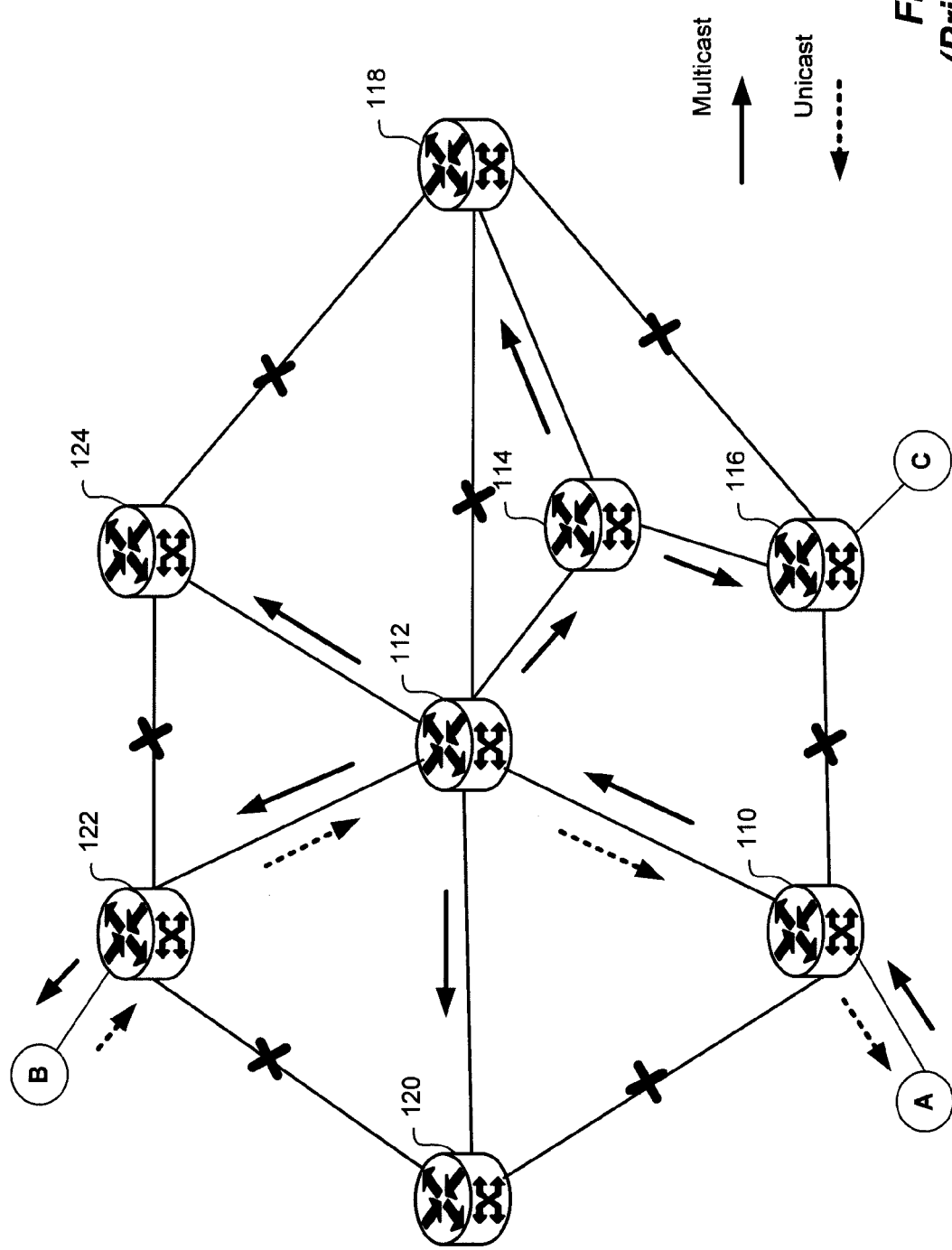
FIG. 1 is a schematic representation of a mesh network using spanning tree protocol (STP)

Embodiments of the present invention are described below, by way of example only, with reference to FIGS. 2-9. The present invention provides a system, method and device for loop-free Ethernet networking.

Provider Link State Bridging (PLSB) enables Ethernet networks to be scaled from the LAN space to the WAN or provider network space by providing more efficient use of network capacity with loop-free shortest path forwarding. Rather than utilizing a learned network view at each node by using the Spanning Tree Protocol (STP) algorithm combined with transparent bridging, in a PLSB based network the bridges forming the mesh network have a synchronized view of the network topology. This is achieved via the well understood mechanism of a link state routing system. The bridges in the network have a synchronized view of the network topology, have knowledge of the requisite unicast and multicast connectivity, can compute a shortest path connectivity between any pair of bridges in the network and individually can populate the forwarding information bases (FIBs) according to the computed view of the network. When all nodes have computed their role in the synchronized view and populated their FIBs, the network will have a loop-free unicast tree to any given bridge from the set of peer bridges; and a both congruent and loop-free point-to-multipoint (p2mp) multicast tree from any given bridge to the same set of peer bridges. The result is the path between a given bridge pair is not constrained to transiting the root bridge of a spanning tree and the overall result can better utilize the breadth of connectivity of a mesh.

PLSB provides the equivalent of Ethernet bridged connectivity, but achieves this via configuration of the FIB rather than flooding and learning. As such it can be used by emerging standards such as IEEE (Institute of Electrical and Electronics Engineers) 802.1ah draft standard entitled Provider Backbone Bridges (PBB) or MAC-in-MAC with configured forwarding of B-MACs (Backbone MAC) and trivial modifications to the PBB adaptation function, to map client broadcast behavior to PLSB multicast, such that client Ethernets can utilize the connectivity offered by the PLSB network without modification.

PTSB operation may be combined with other control planes or transparent bridging via partitioning of the network via the use of virtual LANs (VLANs). A VLAN ID can be used to define one instance of the mesh at the control plane level, in the PLSB case this is driven by a distributed link state routing system. When VLAN partitioning of network function is used, PLSB is side-by-side compatible with other Ethernet network technologies such as Provider Backbone Transport (PBT) as disclosed in commonly assigned U.S patent application no. US20050220096 filed Apr. 4, 2004.

PLSB uses symmetrical metrics such that connectivity between any two bridges follows the same path in both directions, and uses common metrics for unicast and multicast connectivity such that there is congruency of forwarding between packets which are multicast and packets which are unicast. There are a number of reasons why this is desirable when PLSB is used to transport Ethernet clients:

1) No possible reordering of packets in a flow where the initial packets are flooded on the multicast path, and forwarding information is learned during the flow to permit forwarding on the unicast path.
2) Much higher probability of failures being symmetric, to counter the known problem for clients utilizing spanning tree, when asymmetrical failures can result in loops.
3) Congruency of forwarding of client IEEE 802.1ag multicast Connectivity Fault Management (CFM) packets and the corresponding unicast path across the PLSB network.
4) Similar congruency of PLSB layer CFM packets.
5) Symmetrical metrics results in equal "go" and "return" transport delays, which greatly improves the effectiveness and robustness of layer 2 clock distribution schemes for disseminating timing information in the network.

As discussed in more detail in the following description, independent of the service requirements of Ethernet clients, symmetrical metrics also facilitate loop suppression.

PLSB uses MAC configuration to construct shortest path loop-free connectivity (for both unicast and multicast purposes) between a set of (slightly modified) 802.1ah provider backbone bridges in order to provide transparent LAN service to the C-MAC (Customer MAC) layer or other layer networks that can use a transparent LAN service. This requires the operation of a link state routing protocol within the provider backbone bridged network in lieu of STP for the associated VLAN(s) and the piggybacking of MAC information on routing system advertisements.

When a transit bridge does not need to terminate unicast or multicast connectivity it may choose not to offer MAC information but will process MAC address advertisements from other bridges. In the 802.1ah case, edge bridges known as provider backbone bridges (PBBs) will just about always offer MAC information, while purely transit bridges will not.

At least two MAC addresses are associated with each bridge, one for unicast forwarding to the bridge and at least one for multicast forwarding from the bridge. The unicast MAC is used by peer bridges when sending packets to the bridge as the destination address for a packet, and identifies the bridge as the source for unicast or multicast traffic from the bridge to its' peers. The multicast address is used by the bridge when sending traffic to multiple peer bridges simiiltaneously to identify the specific multicast tree configured by the routing system. The multicast tree can be configured to deliver a packet to every bridge in the PLSB domain, thus implementing the broadcast function for the specific source bridge. At can optionally identify a strict subset of the broadcast tree to restrict delivery to just those bridges belonging to a particular community of interest, typically a client layer VPN.

As PLSB utilizes configured information and enables all segments in a given mesh network, the flooding associated with transparent bridging is not required and undesirable. Therefore any VLAN partition assigned to PLSB behavior must also have the forwarding behavior modified to treat packets with "unknown" destination MAC addresses differently than that for transparent bridging. For PLSB, packets with unknown destination addresses are silently discarded.

Figure 2A:
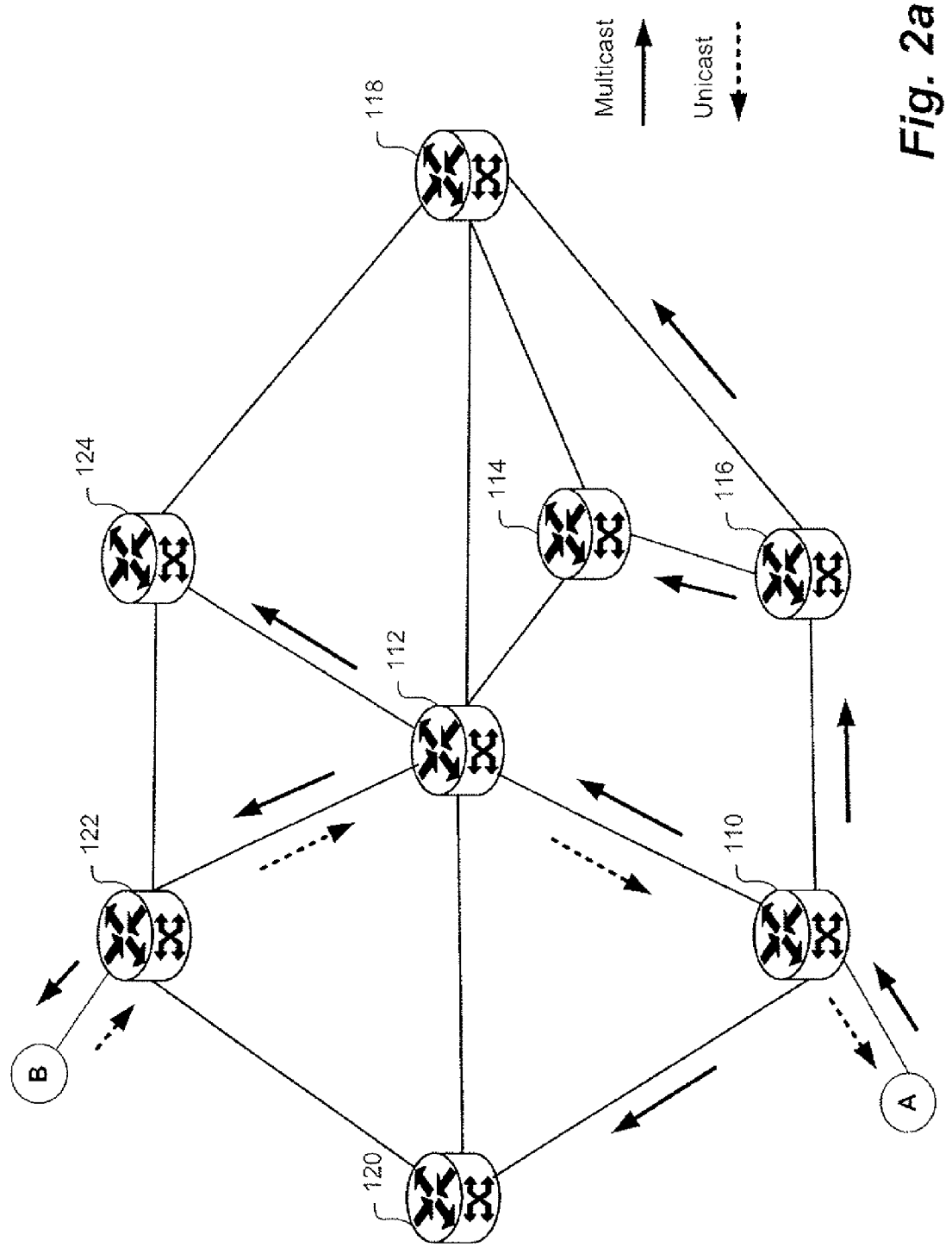
FIG. 2a is a schematic representation of a mesh network implementing PLSB shown from a device A.

FIG. 2a is a schematic representation of a network utilizing PLSB. From the shared network topology each node calculates optimal shortest paths to other provider backbone bridges (PBB) or nodes in the network using a shortest path algorithm. The outcome of the application of the shortest path algorithm across the network, and the corresponding population of the FIB in the bridges provides a unique tree through the mesh from each bridge to the member bridges of the network. For example, the multicast tree calculated using the shortest path from device A in FIG. 2a is different than spanning tree shown in FIG. 1, particularly as there is no root switch election as in STP. As shown in FIG. 2a, utilizing a shortest path algorithm allows a packet originating from device A to travel a more direct route to adjacent bridges 120 and 116, whereas using STP the shortest path routes may be disabled as shown in FIG. 1.

Transparent bridging operations of flooding and learning can be mapped onto PLSB by 802.1ah PBBs implementing PLSB. For example, if location of client device B is unknown to the bridge 110 in the PLSB network, packets addressed to B from A will be MAC-in-MAC encapsulated in a multicast packet by bridge 110 using the group address assigned to that bridge and with a source address of bridge 110. The multicast message traverses the network via the PLSB tree and a copy eventually arrives at node 122 where the MAC-in-MAC encapsulation is stripped and the copy forwarded to device B. The MAC-in-MAC transparent bridging function in bridge 122 observes the source B-MAC address in the MAC-in-MAC encapsulation and makes the association that to get to A it should be via bridge 110. Device B when replying to the message then sends a message addressed to "A" to bridge 122. Bridge 122 notes that the MAC-in-MAC destination for A is bridge 110 and wraps the message in a unicast packet addressed to bridge 110. The packet is sent through bridge 112 to bridge 110 which then strips the MAC-in-MAC encapsulation and forwards the packet on the correct port to reach device A. Similarly, bridge 110 observes that to reach B in the PLSB network it is via bridge 122. Any future messages sent from device A to device B and vice versa may now use learned unicast forwarding across the PLSB network.

The unicast and multicast trees for each bridge are required to be congruent and this will be a direct outcome of the use of symmetrical link metrics. Where multiple paths of equal cost will be encountered, a distributed means of achieving a common ranking of the paths is required, and is a well understood problem with many potential solutions. One exemplar solution is to identify the two bridges where the equal cost paths split and re-merge, select the highest bridge number, and chose the path from/to that bridge with the highest numbered adjacent bridge on the equal cost path segments. Other methods will be apparent to those skilled in the art. The ranked shortest path between any two bridges is symmetrical, so congruence of both unicast and multicast forwarding between any two bridges is achieved.

For a given bridge node to determine if it is on the shortest path between a given pair of bridges, various shortest path algorithms can be used to compute optimal paths. A graph based algorithm such as Floyd's algorithm [R. Floyd: Algorithm 97 (shortest path), Communications of the ACM, 7:345, 1962] or Dijkstra's algorithm [E. W. Dijkstra: A note on two problems in connexion with graphs, Numerical Mathematics, 1:269-271, 1959] can be implemented in the PLSB bridge to compute the shortest path between peer nodes. It should be understood that any suitable shortest path algorithm could also be utilized. Floyd's algorithm computes a distance matrix from a cost matrix where as Dijkstra algorithm computes the shortest distances from a vertex to all other vertices. It should be noted that the number of trees does not impact the computational complexity of the basic Floyd's algorithm. The algorithm generates a different path view than STP algorithm in that paths do not have to extend from a root bridge path. STP generates a more constrained "tree" structure used for all possible paths, whereas a shortest path method is not limited by route selection in the same manner.

The shortest path algorithm can be modified to take into account traffic engineering information. For example, the shortest path can include a measure of cost such as capacity, speed, usage and availability. The preservation of Source MAC between bridges means actual traffic matrix can be observed and used as input into the routing system and minimizing standard deviation of per link loading and facilitate load balancing. It should also be noted that a side-effect of the shortest path algorithms is that "loop-free alternates", the accepted industry term for a next hop which is known to be closer to the destination than the current node, for connectionless fast re-route may be computed as part of computing the network connectivity.

Figure 2B:
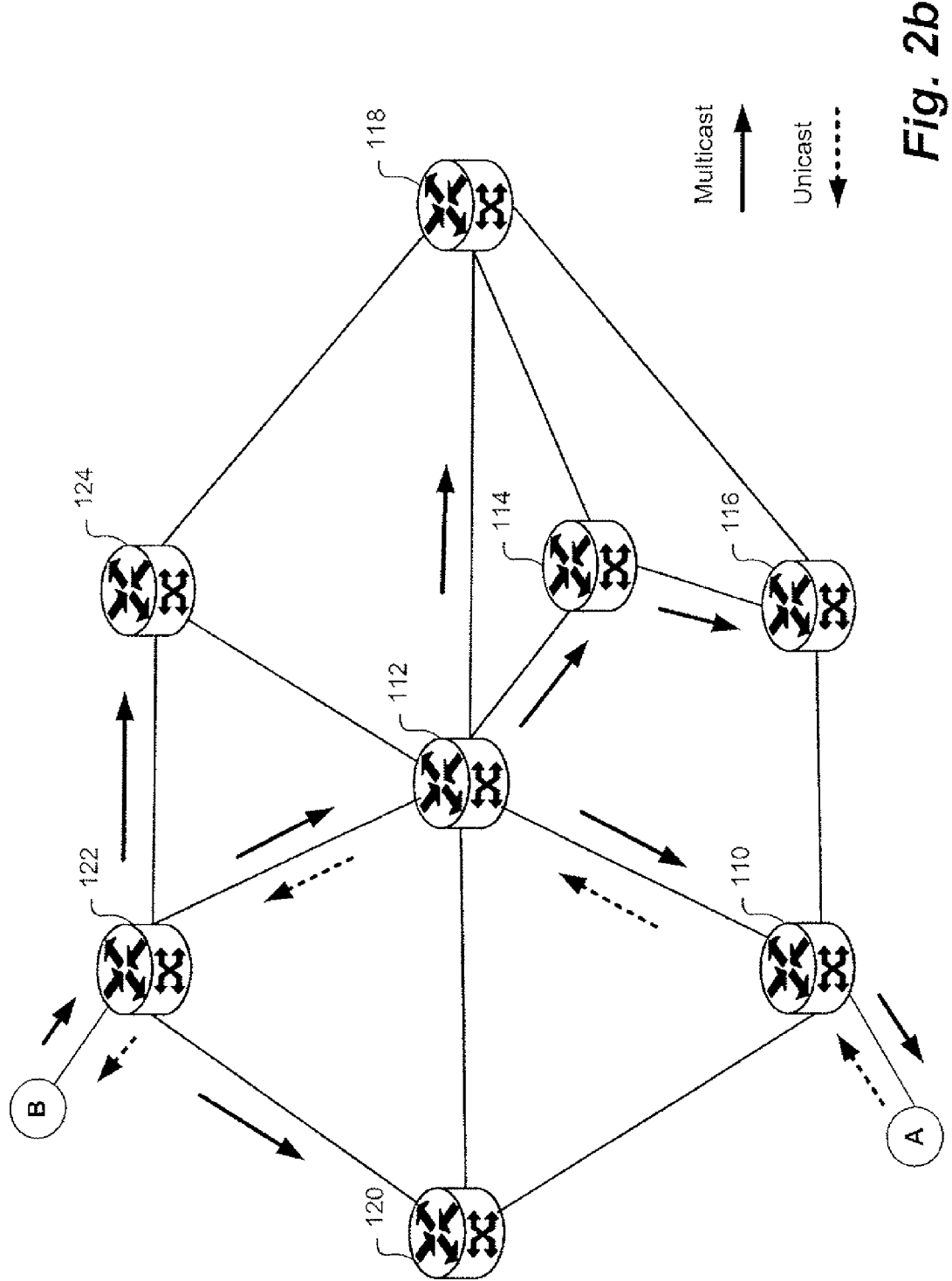
FIG. 2b is a schematic representation of a mesh network implementing PLSB shown from a device B.

As shown in FIG. 2b, looking from device B to bridge 122, the tree resulting from the shortest path algorithm is different then the tree from device A to bridge 110 shown in FIG. 2a. Traffic from device B may arrive at it's destination by the shortest path from connecting bridge 122 and the tree created can be unique as viewed from the bridge. Unique trees from each bridge allow for effective utilization of the network links. However, the path between two devices (A and B) or associated bridges will be symmetrical and therefore the same in each direction.

Referring back to FIG. 2a, if at any point there is a failure of a link on the network, for example if the link between bridge 116 and bridge 118 failed, the only impact is to traffic that transits that link. The failure is advertised by the routing system, and the shortest path algorithm is run. At this point the only change will be to paths that transited the failed link as the unaffected shortest paths will not change. The net result is that the new FIB will be largely identical to the old one, the implication being that there was no actual impact to forwarding of packets on unaffected paths. Referring to FIG. 2b, the failure in the link between bridge 116 and bridge 118 would not impact the routing tree as it is not part of the shortest path. Those skilled in the art will appreciate that there are techniques to minimize the computation performed in failure scenarios which fall outside the scope of the invention. The description above simply illustrates the simplest case when discussing the actions of a routing system such as receiving notification of a topology change, computing a new forwarding table and populating the FIB.

The MAC addresses associated with a bridge (unicast and multicast) are global to the link state controlled Ethernet sub-network and are used for destination based forwarding. This means they can be simply flooded in routing system advertisements and upon local convergence of the routing system can be instantiated in the local bridge forwarding database (or FIB) as directed by the routing system. In this way distributed computation of layer 2 connectivity can be applied to Ethernet bridges without requiring a distinct signaling system to associate connectivity with topology. In its simplest form, when a bridge has computed that it is on the shortest path between two given bridge nodes, it simply installs the MAC addresses associated with those bridges in the FIB, the unicast MAC addresses pointing to each of the bridges of interest and the multicast MAC address(es) pointing from the bridges of interest. Further refinements may include adding community of interest information to the routing advertisements such that a bridge determines that when it is on the shortest path between two nodes, if they have intersection of community of interests, it can modify what is populated in the forwarding tables accordingly.

A unique mesh can be configured per VLAN using the PLSB mechanism. Normally a single mesh would be sufficient, however in the case of equal paths it may be desirable to spread the traffic such that equal cost paths can be utilized. Where multiple permutations of connectivity are required (e.g. efficient utilization of equal cost paths) this can be achieved via the delegation of more than one VLAN to PLSB operation while still using a single routing protocol instance. When computing the shortest paths, the operation is repeated for each VLAN while having assigned a distinct ranking algorithm to each VLAN for tie breaking, and load spreading at the edge across the range of VLANs delegated to this mode of operation. Additional MAC addresses are not required as their function is to unambiguously identify the end-points, and the VLAN determines the ranking algorithm for route selection.

It should be understood that although a single unicast MAC address per bridge is described, nothing precludes the use of finer granularity, and a unicast MAC address may refer to a line card, a virtual switch instance (VSI) or UNI port. This may be desirable to simplify de-multiplexing of flows at a destination bridge.

Loop suppression is required in the network to maintain connectivity (albeit in a potentially degraded form) during periods of instability (the period between a topology change, advertisement of same by the routing system to all bridges in the network, and re-convergence on a common view of the new topology and corresponding update of forwarding information). Instability in a distributed system frequently means that, at least temporarily, the overall view of the network will not be synchronized.

Ethernet addressing is flat and non-aggregateable which implies a single routing domain, so transient unicast loops are local and relatively harmless, and only persistent unicast loops and any multicast loops need to be dealt with. As metrics are symmetrical and common for both unicast and multicast forwarding then the shortest path in each direction will be the same between any two devices for both unicast and multicast paths. If it is the same, then in a converged network each bridge knows the interface on which to expect any given Source MAC, because in the FIB the port that the MAC should be configured to point to is the return path. It should further be noted that the source address of a packet is common to both unicast and multicast packets, that is the unicast source address of the sender.

In any distributed system transient loops will occur in conjunction with topology changes. In rare cases permanent loops can also occur as a consequence of implementation errors, or hardware problems. This is also true for a network comprising multiple routing domains due to configuration or policy problems, however only a single domain or strict hierarchy is considered in PLSB (vs. a peer mesh of routing domains). Loops form when some nodes know information about network and when other do not. This will occur due to propagation delays of network information which frequently means not all nodes converge at the same time. For distributed routing to work, there is an assumption that eventually all sane nodes will have a synchronized view and have computed a common result.

As noted earlier, symmetrical metrics are used such that the shortest path between any two nodes is identical in both directions. When combined with configuration of the forwarding database by link state routing, sufficient information will exist in the forwarding database to permit traditional MAC learning procedures to be modified to be an audit of whether packets are received on expected interfaces (segment of arrival from a given source corresponds to the segment on the shortest path to that source) by performing what is termed a Reverse Path Forward Check (RPFC). This permits packet by packet auditing of loop-freeness without having to block ports or otherwise grossly interrupt network connectivity. This produces loop-free Ethernet any-to-any connectivity without use of STP.

The bridge performs a sanity check on packets based upon a comparison of the Source MAC address contained in the packet and the segment on which the packet arrives with what is configured for that same MAC address as a destination in the forwarding database. When RPFC policing is enabled, if the learned segment for the source MAC address would modify a static entry, or there is no static entry, then the packet is discarded. For example referring to FIG. 2a, if a packet having the Source MAC of bridge 110 arrives at bridge 112 via ports associated with the other connecting links to bridges 114, 118, 120, 122 or 124 the packet is discarded as the ports would not have an entry associated with the Source MAC for bridge 110. RPFC presumes a bug free and consistent implementation of the link state routing system within the sub-network.

As noted earlier, a correctly converged network will have one bi-directional shortest path between any pair of bridges in the network. PLSB routing by definition assigns both direction of a link "equal weight". With RPFC enabled, a packet getting from bridge A to bridge B is the logical "AND" of correct convergence of all intermediate nodes for both directions. Any packet encountering incorrect or un-converged paths will be discarded rather than taking the chance that they will loop.

Figure 3:
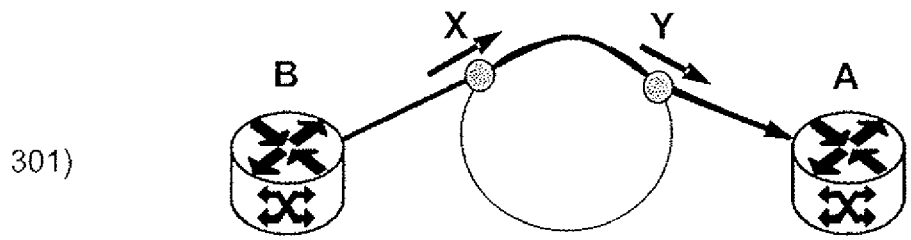
FIG. 3 is a schematic diagram of a packet looping scenario.
Figure 3:
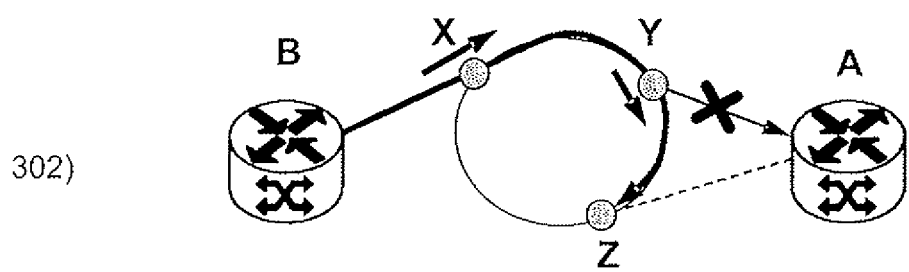
Figure 3:
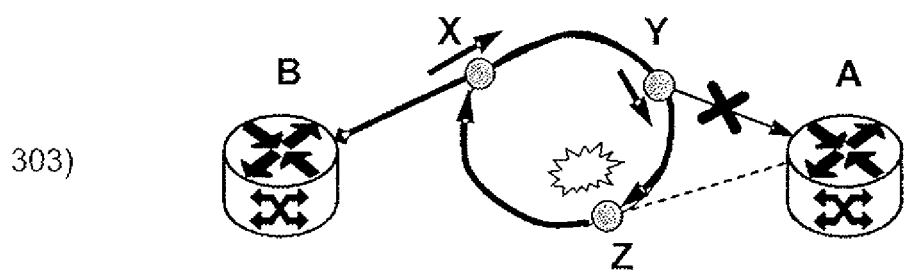
Figure 3:
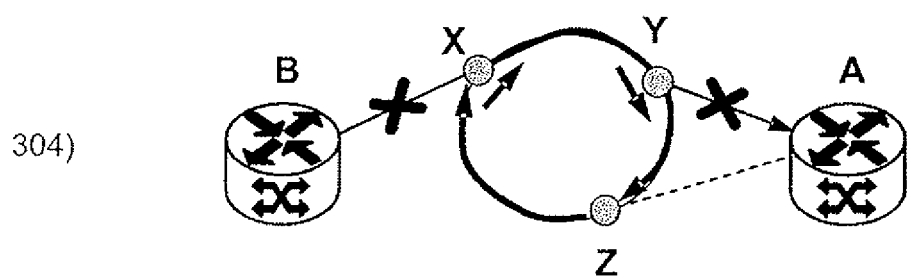
Figure 4:
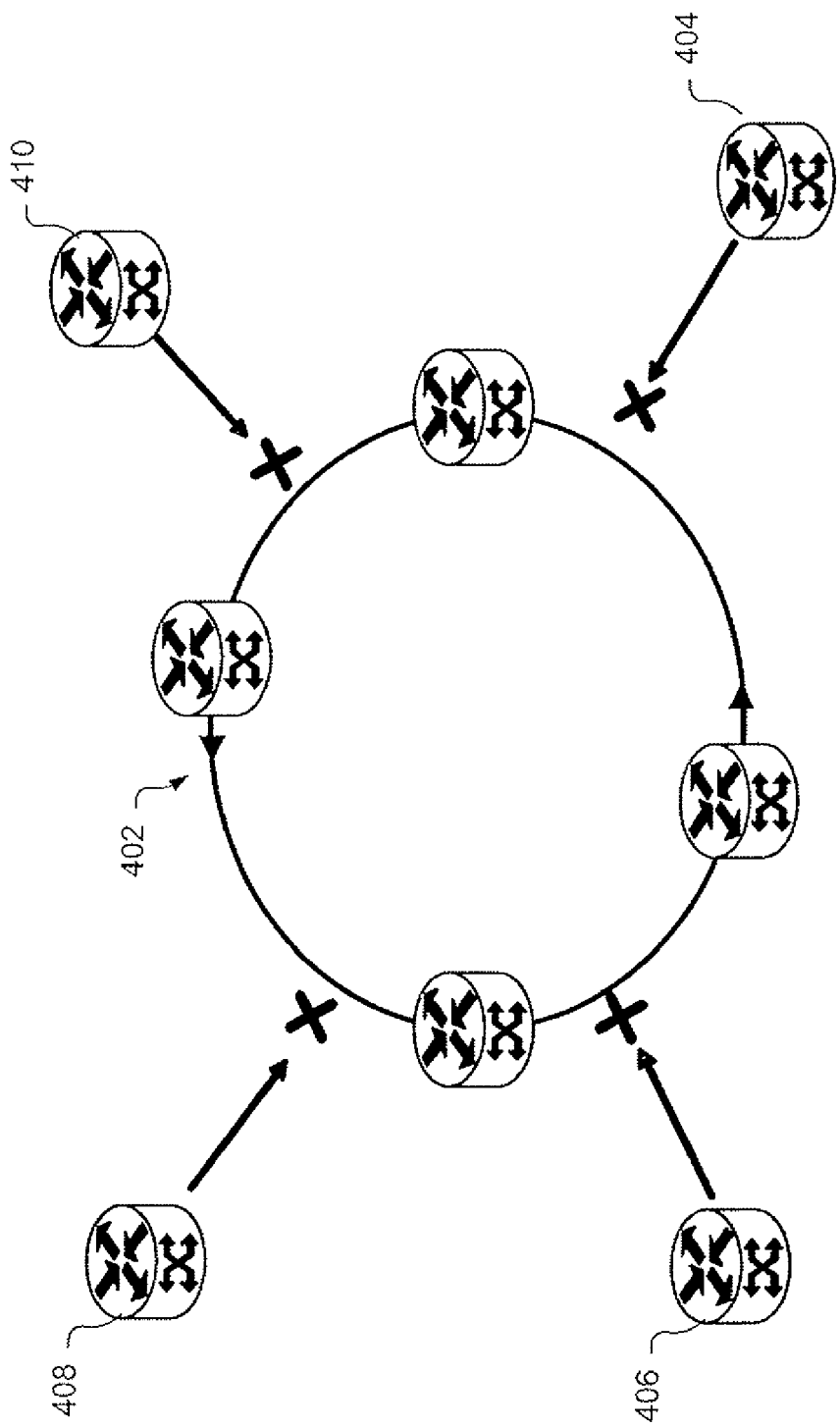
FIG. 4 is a schematic representation of port blocking during convergence.

FIG. 3 is a schematic representation of how looping may occur in a network. The example starts with a working system forwarding from device B to device A and vice versa at step 301. Shown at step 302, to initiate a possible transient loop, e.g. the link from node Y to device A must fail AND device A must be dual-homed on the loop, so node Y keeps trying to deliver the packet via the second link. The creation of a loop in a PLSB network assumes that loop suppression mechanisms have somehow failed.

As shown at step 303, to keep the loop going at bridge i, bridge Z must believe that the shortest route to bridge Y is clockwise, via bridge X, in direct contradiction to bridge Y, which has decided to go direct bridge Y to bridge Z, which is only consistent with bridge Z to bridge Y, OR bridge Z to device A, To keep the loop going at bridge X, there must then be a second failure as shown in step 304. However when RPFC is employed, a loop in both forward and reverse direction simultaneously is required. It is easy to conceptually envision a loop in a forward direction but it is less easy to envision both directions happening. A loop is specific to a shortest path between two devices. So a loop to a specific MAC address does not mean all traffic to that address will loop, only that for which the return path is also in a congruent loop.

Guaranteed loop-freeness can be substantiated by an intuitive informal proof. Two counter-rotating directions on a loop cannot exist simultaneously, the conditions to create such a forwarding construct inherently have a paradox if conditions to produce a loop in one direction are mirrored. RPFC requires that a loop be congruent in both the forward and reverse direction. The essence of the intuitive proof is that in a sane system this cannot simultaneously be true for both directions. For there to be a shorter path between a given pair of nodes on a path than the current working one, links or resources need to be added, and knowledge of that needs to be confined to a single direction for a loop to actually form. That knowledge of the added resource is required to be symmetrical (both directions) simultaneously to defeat RPFC is inherently a paradox.

It should also be noted that if a combination of failures or insane implementation actually formed a loop, the loop has the property that once formed, no further traffic may enter the loop so that packets can only leave if they hit a replication point. As illustratively shown in FIG. 4, when a loop 402 forms between multiple bridges, because of RPFC the only valid source for packets in a loop is the loop itself. Looping packets are constrained to those packets already trapped in the loop. No further traffic from bridges external to the loop from nodes 404, 406, 408 and 410 can enter the loop. This means that only simple loops can form if at all. A duplicated packet cannot remerge back into the original flow as it is impossible for a loop to accept more than one interface as valid sources for a given source address.

RPFC can therefore be utilized as a loop prevention mechanism which performs packet by packet policing of loop-freeness (vs. TTL or port blocking) It is also important to note that the granularity of a loop is significantly constrained as it has to exist for a source/destination pair.

RPFC has the benefit of not requiring modifications to the Ethernet packet and minimal modifications to the implementation of a bridge. RPFC is aggressive policing as there may be other causes of a packet arriving on an unexpected interface therefore the ability to not employ it in selective circumstances is desirable. PLSB multicast is exclusively on the basis of Ethernet MAC addresses (e.g. as opposed to flooding in a VLAN). Ethernet multicast MAC addresses include an explicit multicast indication on the destination MAC address which permits unique policing treatment to be applied to unicast or multicast packets (note that similar to PBT flooding of unknown packets is prohibited). For configured unicast forwarding, a transient loop is not catastrophic as the network merely buffers packets in the loop until such time as the loop unravels or buffering capacity is exceeded resulting in discard of additional traffic received. This means during network convergence, loop suppression can be turned off, as transient loops are harmless and non-replicating (network simply buffers till loops clear), when network is stable unicast suppression is turned back on, to instantly squelch any persistent loops.

Other strategies can be considered such as periodically enabling RPFC for unicast simply to check if a persistent loop condition exists (detected via discard of traffic), and if not turning it back off. The consequences of looping are significantly different for multicast traffic, a transient loop could result in unbounded replication, therefore RPFC is never disabled for packets with multicast destination MAC addresses. For multicast, loop suppression should be left on all the time so that non-converged multicast forwarding discards packets aggressively and prevents loops.

Trees not affected by a topology change will continue to function normally as there is no change to the FIB or instability for those paths associated not associated with the topology change, but those affected by the change may experience interruptions in connectivity as RFPC discards packets for non-converged multicast paths. In terms of the overall network, this will be analogous to a temporary "brown out" in service. Learned entries do not supersede configured entries so the enabling/disabling of policing will not result in corruption of the configuration instantiated by the routing system.

Figure 5:
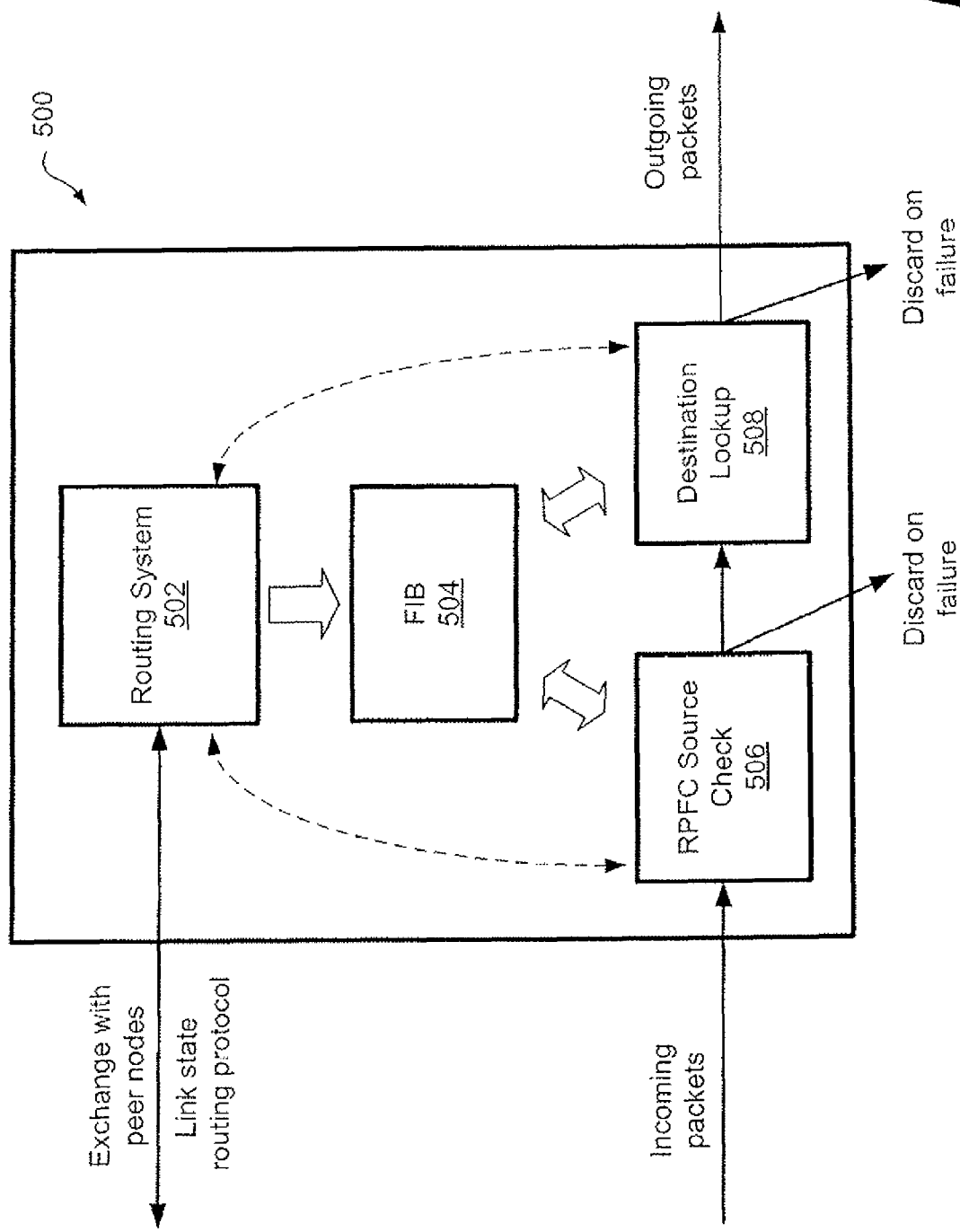
FIG. 5 is a schematic representation of a PLSB bridge.

FIG. 5 is a schematic representation of a possible implementation of bridge node 500 for implementing PLSB. The routing system module 502 exchanges information with peer bridges in the network regarding the network topology using a link state protocol routing. As discussed previously the exchange of information allows the bridges to generate a synchronized view of the network topology which then allows the routing system 502 module to calculate the shortest path tree (using an algorithm discussed above) during convergence. The FIB 504 is populated with the appropriate entries for directing traffic through the network based upon the determined paths. A RPFC source check module 506 processes incoming packets 500 and performs a lookup in the FIB 504 to determine if the received port coincides with the port identified in the FIB 504 for the particular Source MAC. If the received port/Source MAC does not match the expected port/Source MAC, the packet is discarded. Similarly if the routing system 502 identifies to the RPFC source check 506 that the network in the process of converging, loop suppression is disabled for unicast. When the network has converged, loop suppression is re-enabled for unicast packets. For multicast packets, as identified by the multicast destination address, RPFC source check 506 is never disabled during convergence. If the packet passes the RPFC source check 506 module, or if the check is disabled, the destination lookup 508 module determines from the FIB 504 which port the packet should be forwarded to the destination unicast or multicast MAC address. If there is not a valid entry the packet may then be discarded. If the bridge is at the edge of the network, MAC-in-MAC encapsulation of the packet may occur (not shown) utilizing unique unicast and multicast addresses prior to the forwarding of the outgoing packets. It should also be understood that the modules described are for illustrative purposes only and may be implemented by combining or distributing functions among the modules of a bridge node as would be understood by a person of skill in the art.

Figure 6:
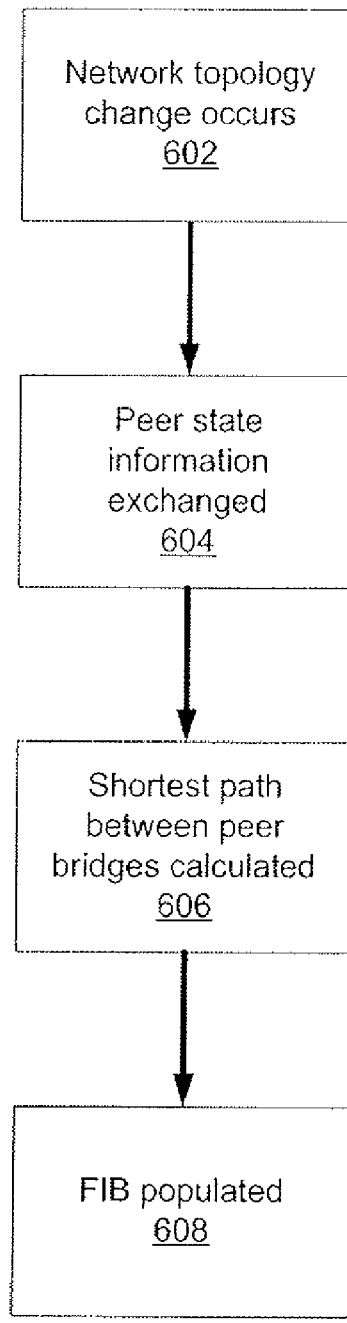
FIG. 6 is a flow diagram of a method for configuring a PSLB bridge.

FIG. 6 shows and embodiment a method of configuring a PLSB bridge 500 for operation. When a network topology change occurs at step 602, such as a bridge or link failure, state information is exchanged between bridges in the network at step 604 by the routing system module 502. The routing system module 502 builds a synchronized view of the network configuration by storing topology information in a bridge resident database. The bridge can then determine shortest paths between peer bridges at step 606 using a shortest path algorithm as previously described. The FIB 504 is then populated at step 608 with the appropriate routing entries to enable connectivity. Packets can then be processed by the bridge. If a network topology change occurs the process is restarted.

Figure 7:
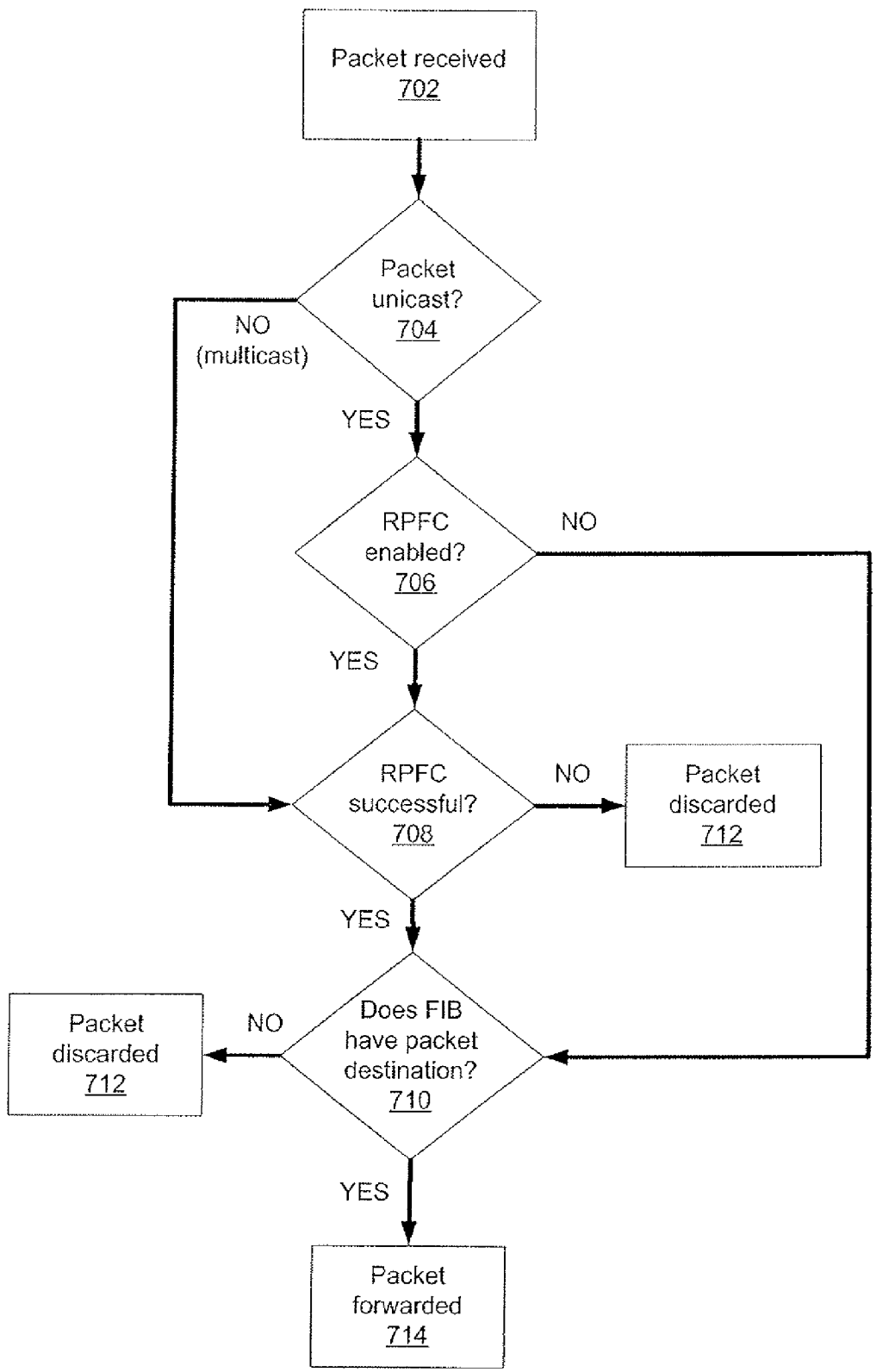
FIG. 7 is a flow diagram of a method for operating a PLSB bridge.

FIG. 7 shows an embodiment of the bridge node 500 processing received packets. A packet is received at a port of the bridge at step 702. At step 704 the destination address is used to determine if the packet is a multicast packet or unicast packet. If the packet is unicast, (YES at step 704) the routing system is converged, RPFC is therefore enabled (YES at step 706) and is performed at step 708. If the RPFC is successful (YES at step 708), i.e. the packet arrived at the expected port for the associated source MAC address, a lookup in the FIB of the outgoing port for the destination MAC occurs at step 710. If RPFC is not enabled (NO at step 706), i.e. looping conditions are present and the network is not converged, RPFC is bypassed and a lookup directly occurs for forwarding the packet at step 710. If there is an entry for the associated MAC address (YES at step 710) the packet then forwarded to it's destination at step 714. If the RPFC is not successful (NO at step 708), i.e. packet did not arrive at the expected port based upon the source address, the packet is discarded at step 712. Similarly if the packet does not have an appropriate entry (NO at step 710) the packet is discarded at step 712.

if the packet is a multicast packet (NO at step 704), RPFC is always enabled and is performed at step 708. If the RPFC is successful (YES at step 708), i.e. the packet arrived at the expected port for the associated MAC address, a lookup in the FIB of the outgoing port for the destination MAC occurs at step 710. If there is an entry for the associated MAC address (YES at step 710) the packet then forwarded to it's destination at step 714. If the RPFC is not successful (NO at step 708), i.e. packet did not arrive at the expected port based upon the source address, the packet is discarded at step 712. Similarly if the packet does not have an appropriate entry (NO at step 710) the packet is discarded at step 712. As previously noted RPFC may be periodically enabled for unicast simply to check if a persistent loop condition exists (detected via discard of traffic), and if not turning it back off.

So far a provider link state bridged network has been described that supports a single community of interest, however it is also possible to support multiple communities of interest where any individual community only requires connectivity to a subset of the ports and therefore bridges in the PLSB network. What is required is multicast connectivity constrained to the set of bridges participating in the community of interest and common unicast connectivity, and a mechanism for associating a given packet with a community of interest. The IEEE 802.1ah I-SID) (extended service ID) field is one example of a mechanism that associates a packet with a community of interest. The community of interest (e.g. I-SID) identifier can also be incorporated into routing system advertisements so that nodes may identify interest in I-SID identified communities of interest, finally each bridge associates a unique group multicast address with each I-SID advertised. A bridge that finds itself on the shortest path between two bridges installs the unicast MAC addressees) associated with each bridge, and the multicast MAC addresses for all I-SIDs common to the two bridges. The consequence of this is that a given edge bridge will have unicast connectivity to all peer bridges, and multicast connectivity unique to each I-SID identified community of interest. This will be in the form of being a leaf on a multipoint-to-point (mp2p) unicast tree to each peer, and being the root of an (S, G) point-to-multipoint (p2m p) multicast tree, where S is the address of the source and G is the multicast group address, to the set of peer nodes for each community of interest. If the bridge pair has no I-SIDs in common, a further refinement could be that no unicast MAC address is installed. Similarly the bridge pair may be transit bridges and have chosen not to offer any MAC information for flows either terminated or originated by the node. In this way, not only is multicast connectivity confined to specific groups of interest, the approach is frugal in consumption of forwarding table space for unicast connectivity.

Figure 8:
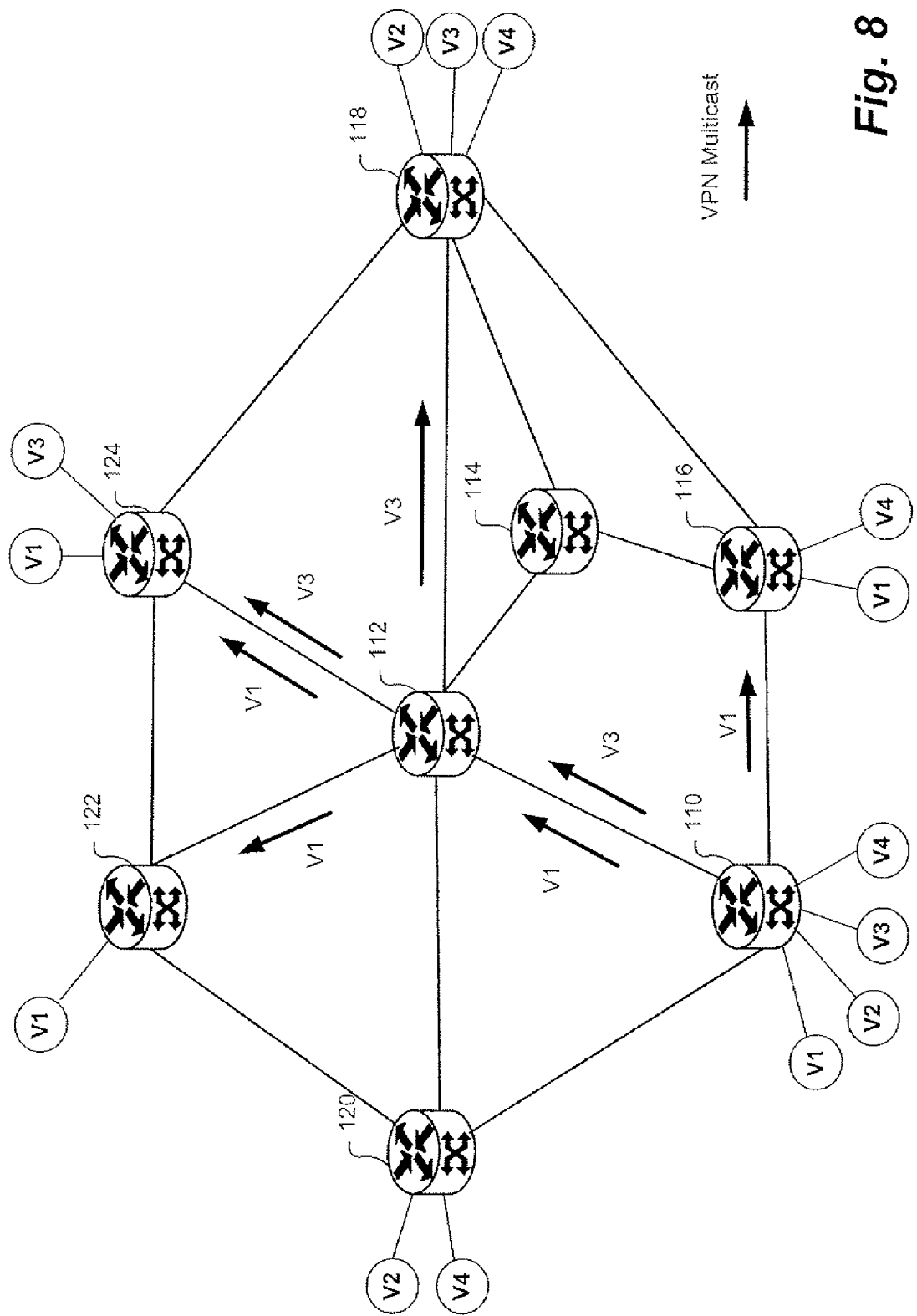
FIG. 8 is a schematic representation of a VPN overlay using PLSB.

FIG. 8 shows how virtual private networks (VPN) can be mapped on top of the PLSB network allowing for a unique multicast tree to be mapped per VPN per edge bridge. In the multicast VPN scenario multicast traffic is only delivered to bridges participating in the VPN. VPN group multicast addresses are installed for the paths that are common. Four VPN networks are identified as V1, V2, V3 and V4. Multiple VPNs can be hosted off a bridge such as bridge 110 and can be individual VPN end devices. For each VPN, for example V1 and V3, unique multicast trees are created. Only routes to bridges containing end points of the corresponding VPN are identified. For example a routing tree for V1, paths to bridge 116 and between bridge 112 to bridge 122 and bridge 124 are required. Similarly, a routing tree for V3, paths to bridges 112 and onto bridges 118 and 224 are required. This eliminates the possibility that VPN traffic from V1 will be delivered to bridges not hosting VPN V1 or VPN V3 end devices. Each VPN may have a tree per edge bridge unique to the VPN based upon the shortest path algorithm.

Similar to the ability to define VPNs, asymmetrical connectivity can be constructed. Normally PLSB creates (*, G) multicast connectivity, * means all sources, and the G represents the multicast group, as a full mesh of (S, G) multicast trees, where S indicates a source in group "G". It may also be desirable for a given service instance to limit connectivity to (S, G). This can easily be done for multicast by adding attributes to the advertisement indicating desire to be a source, a sink or both a source and sink for a given multicast group. Bridges establishing that they are on the shortest path between two other bridges use the source/sink attributes to determine which multicast group addresses should be installed. More complex connectivity can be constructed via repeating instances of this with different attribute configurations. For example one can envision two sets of devices in a network both participating in two VPNs. As a matter of policy, connectivity is only permitted inter-set and not intra-set (a practical instantiation being head-office/branch office connectivity), So the first VPN has source attribute for set A, and sink attribute for set B. The second VPN has sink attribute for set A and source attribute for set B, When an transparent bridging overlay is considered, the imposition of such constraints means that unknown flooding from set A is constrained to set B and vice versa. Hence the two sets can never learn intra set connectivity, and set A devices only communicate with set B, and vice versa.

Figure 9:
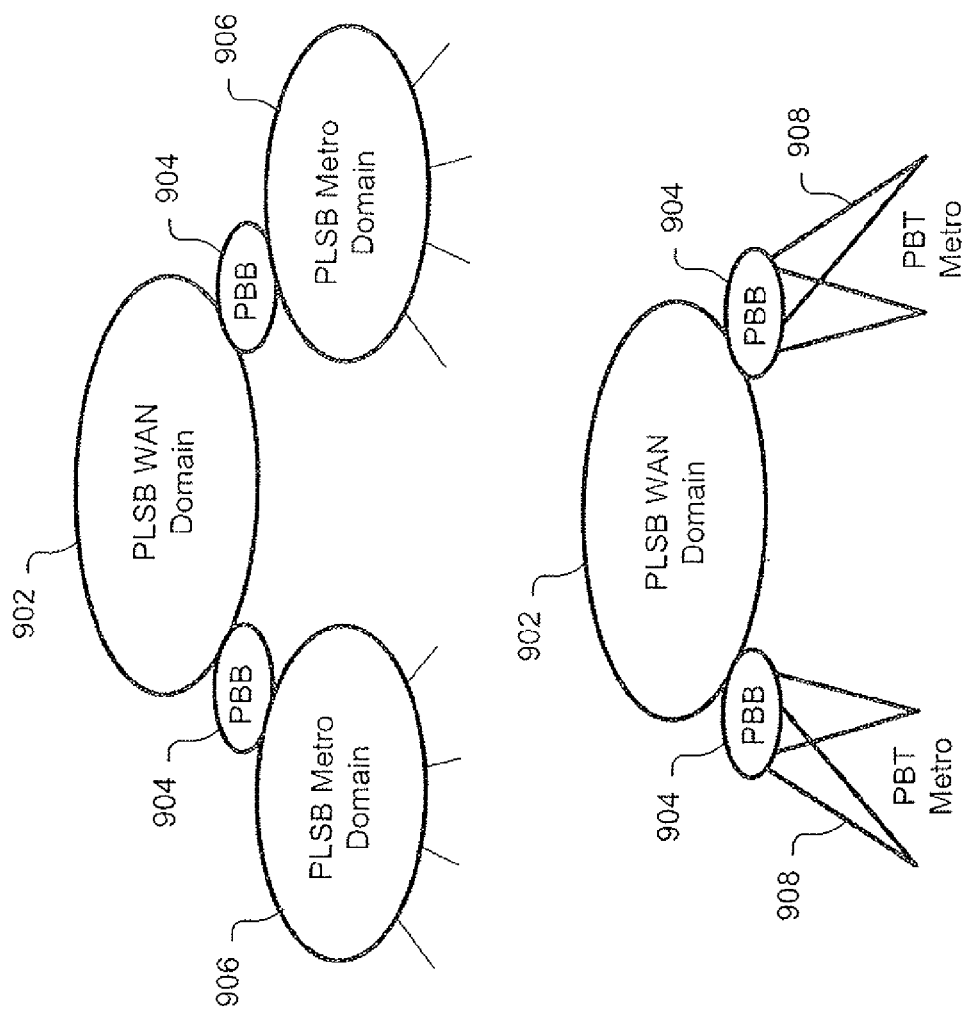
FIG. 9 is a network schematic of PLSB in combination with hybrid PBB and PBT networks.

As shown in FIG. 9, networks can be scaled by utilizing other technologies such as PBT (as described in commonly assigned application US20050220096) and 802.1ah PBB. PBB 904 can be used as a loose equivalent to Area Border Routers (ABRs) to tie PLSB areas together such as PLSB WAN domains 902 and PLSB metro domains 906 or extend connectivity using PBT 908. Inspection of client information at area boundaries permits a peer area to simply be modeled as a single MAC address in the routing system of adjacent areas, or to inter-work with PBT fan-in domains that appear as a single B-MAC to peers, and either of these techniques provides summarization. To ensure inter domain loop freeness, the network is a strict hierarchy of domains and a mesh of routing domains cannot be supported.

At the far end of the network, the source B-MAC for a given source C-MAC is noted, similarly to how source learning operates with the source B-MAC doubling for port ID. This procedure is trivially modified to operate with link state bridging. The C-MAC to B-MAC learning procedure is unmodified. Where a B-MAC has not been learned for a C-MAC, the bridge's multicast address appropriate to the community of interest (typically the client VPN) is used, and this provides the required emulation in PLSB space of a C-MAC broadcast.

The PLSB provides a MAC-in-MAC bridged network with most of the Spanning Tree Protocol's downsides eliminated. This results in far better utilization of mesh connectivity, and far faster convergence as each device has link state database. Unicast connectivity is not disrupted during network re-convergence. In addition PLSB provides the ability to operate side by side with PST (using a different VID range) or concatenated with PBT (in a hub implementation), and Ethernet attributes are fully preserved providing perfect emulation for client layers.

The embodiments of the invention described above are intended to be illustrative only. The scope of the invention is therefore intended to be limited solely by the scope of the appended claims.

The invention claimed is:

1. A provider link state bridging Ethernet node, the node comprising:
   at least one associated unicast media-access-control (MAC) address;
   at least one associated multicast MAC address;
   a routing module for exchanging link state routing information between nodes based upon the respective unicast MAC address and a plurality of multicast MAC addresses of peer nodes and for determining shortest path connectivity between peer nodes and wherein when multiple equal cost paths are available, the selected shortest path is arranged to be consistent for all bridges participating in the routing information exchange;
   a forwarding information base (FIB) populated with forwarding information received from the routing module for identifying connectivity from the node to peer bridge nodes, wherein the unicast MAC addresses point to peer nodes and the multicast address point from peer nodes;
   a reverse path forwarding check (RPFC) module for inspecting incoming packets and determining whether the packets arrived on the same ingress port as would be used as an egress port, as determined by the FIB, to forward a packet with a destination MAC address equal to the ingress source MAC address; and
   a forwarding module for determining, from the FIB, if an egress port of the node is associated with the destination MAC address of a peer bridge and forwarding the packet.

2. The Ethernet node of claim 1 wherein the RPFC module discards the packet if it is determined that the packet did not arrive on the correct ingress port.

3. The Ethernet node of claim 1 wherein the RPFC module is disabled for unicast traffic when the network topology and the routing module is not converged.

4. The Ethernet node of claim 3 wherein the RPFC module is periodically enabled for unicast packets to check if a persistent loop condition exists by detecting the discard of packets.

5. The Ethernet node of claim 1 wherein the forwarding module discards the packet if an egress port is not identified in the FIB for the packet destination MAC address.

6. The Ethernet node of claim 1 wherein the at least one unicast MAC addresses are assigned to one of a line card, a virtual switch instance (VSI) or IJNI port or other arbitrary naming of terminations at a bridge, or are representative of MAC terminations behind the bridge.

7. The Ethernet node of claim 1 wherein the routing module determines the shortest path by Floyd's algorithm or Dikjstra's algorithm.

8. The Ethernet node of claim 1 where the FIB module is populated based upon information related only to nodes in the shortest path.

9. The Ethernet node of claim 1 wherein the link state information includes community of interest information within the routing advertisements such that each bridge can determine, when it is on the shortest path between two nodes, if the two nodes have intersecting communities of interests, the bridge modifies what is populated in the forwarding tables accordingly.

10. The Ethernet node of claim 1 wherein the link state information further comprises including a plurality of virtual LAN (VLAN) identifiers wherein each identifier is used to define one instance of the mesh at the control plane.

11. The Ethernet node of claim 10 wherein the plurality of VLAN identifiers may be used to partition the network to facilitate the spreading of traffic in the mesh such that multiple equal cost paths can be utilized.

12. The Ethernet node of claim 11 wherein the routing module determines the shortest paths for each VLAN while having assigned a distinct ranking algorithm to each VLAN for tie breaking between multiple equal cost paths to load spread across a range of VLANs.

13. The Ethernet node of claim 1 wherein the link state information includes an extended service ID (I-SID) incorporated in the link state routing advertisements to identify a unique multicast group, wherein a bridge that that is on the shortest path between two bridges installs the unicast MAC address associated with each bridge, and the multicast MAC addresses for all I-SIDs common to the two bridges.

14. A method of configuring and operating a provider link state bridging Ethernet node in a mesh networks the method comprising:
   exchanging link state information with peer nodes wherein each node has at least one associated unicast media-access-control (MAC) address and at least one multicast MAC address;
   determining shortest paths to peer nodes by a shortest path algorithm based upon the exchanged link state information and wherein when multiple equal cost paths are available, the selected shortest path is arranged to be consistent for all bridges participating in the routing information exchange;
   populating a forwarding information base (FIB) with the determined shortest paths utilizing associated unicast MAC addresses pointing to peer nodes and multicast MAC addresses pointing from peer nodes;
   performing a reverse path forwarding check (RPFC), by inspecting the source MAC address of an incoming packet to determine whether the packet arrived on the same ingress port of the node as would be used as an egress port of the node to forward a packet with a destination MAC address equal to the ingress source MAC address, wherein the packet is discarded if the RPFC fails; and
   forwarding the packet to a peer bridge, if the RPFC is successful, via an egress port of the node associated with the destination MAC of the packet as identified in the FIB.

15. The method of claim 14 wherein the step of performing the RPFC is selectively bypassed for unicast traffic when the network topology and therefore routing module is not converged.

16. The method of claim 14 wherein the step of determining shortest paths utilizes a Floyd's algorithm or Dikjstra's algorithm.

17. The method of claim 16 wherein the shortest path algorithm further includes a measure of cost selected from a group comprising capacity, speed, usage and availability net of other applications using the network.

18. The method of claim 14 wherein the routing module utilizes common metrics for unicast and multicast connectivity such that there is congruency of forwarding between packets of either type.

19. The method of claim 14 wherein the step of populating the FIB is only based upon information related only to nodes in the shortest path.

20. The method of claim 14 wherein the packet is the MAC-in-MAC encapsulation is as per 802.1ah.

21. The method of claim 14 wherein the step of exchanging link state information further comprises including community of interest information within the routing advertisements such that each bridge can determine, when it is on the shortest path between two nodes, if the two nodes have intersecting communities of interests, the bridge modifies what is populated in the forwarding tables accordingly.

22. The method of claim 14 wherein the step of exchanging link state information further comprises including a plurality of virtual LAN (VLAN) identifiers, wherein each identifier is used to define one instance of the mesh at the control plane.

23. The method of claim 22 wherein the plurality of VLAN identifiers may be used to partition the network to facilitate the spreading of traffic in the mesh such that multiple equal cost paths can be utilized.

24. The method of claim 23 wherein the step of determining the shortest paths is repeated for each VLAN while having assigned a distinct ranking algorithm to each VLAN for tie breaking between multiple equal cost paths to load spread across a range of VLANs.

25. The method of claim 14 wherein the step of exchanging link state information further comprises including an extended service ID (I-SID) incorporated in the link state routing advertisements to identify a unique multicast group, wherein a bridge that that is on the shortest path between two bridges installs the unicast MAC address associated with each bridge, and the multicast MAC addresses for all 1-SIDs common to the two bridges.

26. The method of claim 14 wherein the step of exchanging link state information further comprises providing asymmetrical VPN connectivity by adding attributes to the link state advertisement indicating desire of the bridge to be a source, a sink or both a source and sink for a given multicast group, the bridge establishing that it is on the shortest path between two other bridges using the source/sink attributes to determine which multicast group addresses should be installed.

27. An Ethernet bridging network comprising:
   a plurality of bridges each having a forwarding information base (FIB) containing forwarding information for peer bridges in the network, each bridge capable of performing a reverse path forwarding check (RPFC) to determine if an incoming packet arrived on the same ingress port of the bridge as would be used as an egress port of the bridge to forward a packet with a destination MAC address equal to the incoming packet's source MAC address,
   a plurality of paths interconnecting the bridges and forming the network; and
   wherein the FIB is populated based upon link state information exchanged between the plurality of bridges and is used to determine the shortest path between peer bridges, wherein the determination of the chosen paths when multiple equal cost paths are available is arranged to be consistent for peer bridges; and
   wherein one or more bridges has at least one associated unicast media-access-control (MAC) address and at least one associated multicast MAC address, which are utilized in populating the FIB of each peer bridge.

28. The bridging network of claim 27 wherein the RPFC is selectively disabled for unicast packets as identified by the destination address of the packet and enabled for multicast packets when the network topology is not converged between bridges.

29. The bridging network of claim 27 wherein subset of bridges form individual provider link state bridging (PLSB) domains which can be interconnected via a MAC identifying peer PLSB domains.

30. The bridging network of claim 27 wherein Provider Backbone Transport (PBT) networks can be interconnected with edge bridges of the bridging network via a PBT MAC identifiers.

31. The bridging network of claim 27 where provider 802.1ah Provider Backbone Bridging is overlaid on the bridging network.

32. The bridging network of claim 27 wherein a connectivity policy mechanism is constructed by utilizing one of the plurality of bridges as a leaf on a multipoint-to-point (mp2p) unicast tree to each peer bridge, and a root of an (S, G) point-to-multipoint (p2mp) multicast tree to a respective set of peer nodes for each community of interest.

* * * * *